J. B. BLANTON.
SHUTTER FOR MOTION PICTURE PROJECTING MACHINES.
APPLICATION FILED APR. 21, 1920.
1,422,410.
Patented July 11, 1922.
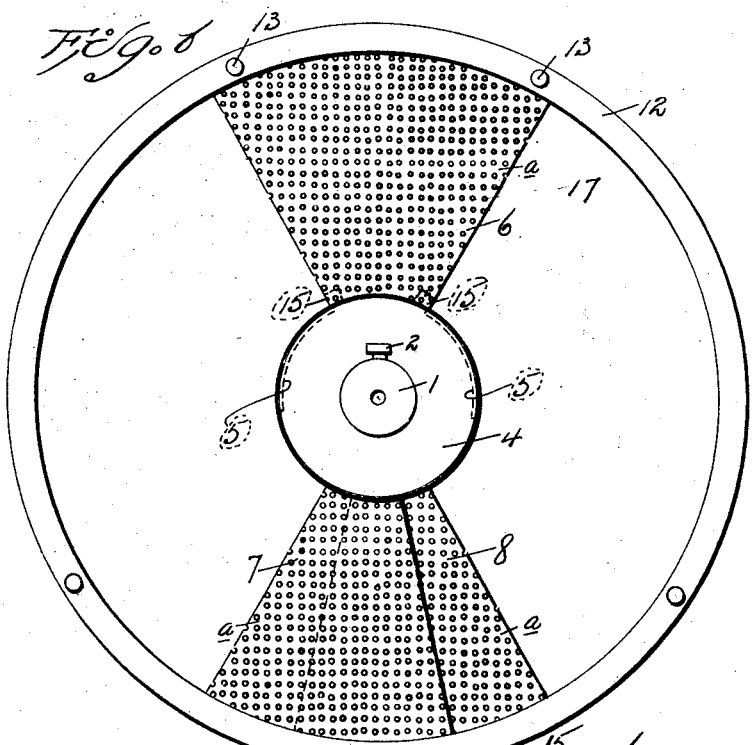
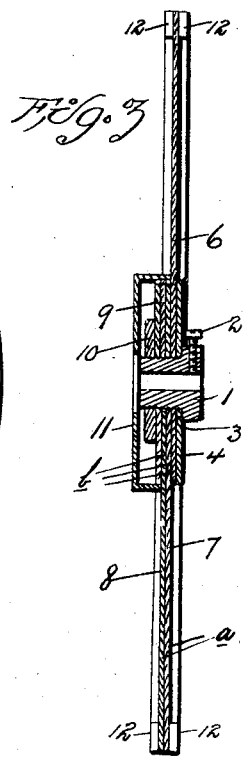
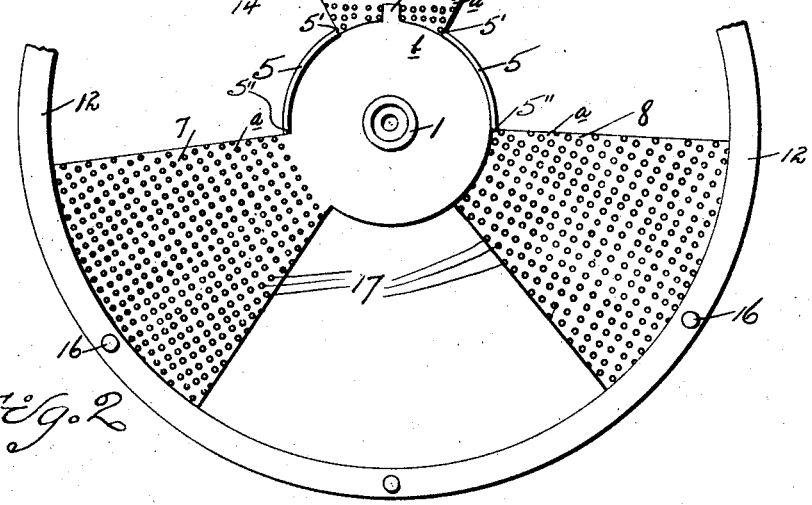
INVENTOR
John B. Blanton
by Ralph Kalish ATTORNEY.

UNITED STATES PATENT OFFICE.

JOHN B. BLANTON, OF CHATTANOOGA, TENNESSEE, ASSIGNOR OF ONE-HALF TO HARRY A. WINGERS, OF ST. LOUIS, MISSOURI.

SHUTTER FOR MOTION-PICTURE-PROJECTING MACHINES.

1,422,410. Specification of Letters Patent. Patented July 11, 1922.

Application filed April 21, 1920. Serial No. 375,591.

*To all whom it may concern:*

Be it known that I, JOHN B. BLANTON, a citizen of the United States, residing at the city of Chattanooga, county of Hamilton, State of Tennessee, have invented certain new and useful Improvements in Shutters for Motion-Picture-Projecting Machines, of which the following is a specification, reference being had to the accompanying drawing, forming a part thereof.

This invention relates generally to motion-picture projecting machines, and more particularly, to certain new and useful improvements in shutters for such machines.

The principal objects of my present invention are to provide a motion picture projecting machine shutter in which the number of so-called light-obstructions per revolution may be readily and conveniently changed to accord with the projecting machine voltage at the arc or to regulate the projected light upon the screen to accord with the picture being projected; to provide a motion-picture projecting machine shutter in which the light-obstructions will sufficiently shut off from the screen film-movements during change of film scenes, but will not completely exclude upon the screen projected rays of light from the machine during change of film scenes, whereby sharp contrast from light to dark and from dark to light and flickering on the screen, usually heretofore and now attendant with projecting-machines employing opaque shutters, is obviated; and to generally improve upon shutters of the class described.

With the above and other objects in view, my present invention resides in the novel features of form, construction, arrangement, and combination of parts hereinafter described and afterwards pointed out in the claims.

In the accompanying drawing,

Figure 1 is a rear elevational view of a shutter embodying my invention, its light-obstructing blades, or sectors, being shown in adjusted position to form or provide two so-called light-obstructions per revolution;

Figure 2 is a front elevational view of the shutter, partly broken away and with the hub or finish cap and clamping washer omitted, with its light-obstructing blades, or sectors, in position to form or provide three obstructions per revolution; and Figure 3 is a vertical sectional view taken approximately centrally through the shutter.

Referring more in detail to the said drawing, which illustrates a practical embodiment of my invention and in which like reference characters refer to like parts throughout the several views, 1 indicates the hub of the shutter, which is in the form preferably of a sleeve adapted for location upon the projector-shaft (not shown), and to which shaft the sleeve is suitably fixed, as by a set-screw or the like 2. The sleeve 1, as seen in Figure 3, is preferably reduced in diameter to provide a shoulder, as at 3, and has its forward end-portion preferably externally threaded, for purposes shortly appearing.

Disposed upon the sleeve to impinge against the shoulder 3, is a back-plate in the form of a disk 4 provided with forwardly presented spaced marginal flanges 5—5.

Motion-picture projecting-machines are today usually operated, so far as I am aware, by motors providing at the arc either a voltage of 110 or 220 volts, and with the present solid or imperforate shutter blades, or sector, the lower voltage machines usually employ a two-blade shutter and the higher voltage machines usually employ a three-blade shutter. I have consequently here illustrated my new shutter with but three-blades, or sectors, for use in connection with either of said machines to selectively meet the arc voltage of the machine or the amount of projected light required or desired in best projecting upon the screen the particular picture being shown. It is to be understood, however, that the present shutter may equally well be constructed of and comprise a greater number of of light-obstructing blades or sectors to meet a larger number of variations of arc voltage or to further regulate the amount of light projected from the machine upon the screen.

In the present shutter, 6, 7, and 8 accordingly indicate what I call the light-obstructing blades or sectors. Each of these blades comprises a major or body portion *a* of substantially sector shape and a hub or end portion *b* of substantially circular or disc contour of a diameter corresponding approximately to the diameter of the disc 4, the hub-ends *b* of the several blades being suitably apertured to fit upon and accommodate the sleeve 1, and the several blades being disposed in engagement at their hub ends with sleeve 1, with their said hub ends in flatwise superposed relation upon, and the hub-end *b* of blade 6 being preferably next adjacent, the back plate 4. As will be seen by reference to Figure 2, the flanges 5 are at one end sufficiently spaced to only accommodate the base of the body portion *a* of the blade 6, the blade 6 fitting at the base of its body portion *a* between the ends of the flanges 5, as shown, and the blade 6 being held by said flanges 5 in fixed position relatively to the sleeve or hub 1 and back plate 4. For purposes of description, I will designate the first-mentioned ends of flanges 5 between which fits blade 6 by the reference character 5′ and the opposite ends of the flanges 5 by the reference character 5″. The flanges 5 are of such length that the space between their ends 5″ is greater, as will be noted by reference to Figure 2, than is the space between the ends 5′ thereof, the greater space between the ends 5″ of the flanges 5 accommodating not only the inner ends of the body portions *a* of blades 7 and 8, but also permitting of circumferential movement of the blades 7 and 8 relatively to the sleeve 1 and back-plate 4. For purposes shortly appearing, each blade 7 and 8 is provided at its hub end *b* with a short radial finger or projection 15 disposed between and adapted for engagement with, the ends 5′ of the flanges 5.

As seen particularly in Figures 1 and 2, the several blades or sectors 6, 7, and 8 project radially from the hub or sleeve 1 and are disposed at the outer ends of their body-portions *a* between a pair of suitably spaced concentric frame rings 12, permanently secured to the fixed blade 6 by screws, rivets, or the like 13. Fitting on the reduced end of the sleeve 1 upon the several superposed blade-hubs *b* is a clamping disk 9, and threaded upon the reduced end of the sleeve 1 to engage disk 9 to hold the several blades from axial movement on the sleeve, is a clamping washer 10. Fitted upon the flanges 5 of back-plate 4 to conceal the clamping disk 9 and washer 10, is a hub or finish-cap 11, illustrated in section in Figure 3.

In use or operation, we will first assume the shutter is to be employed in connection with a projecting machine requiring either on account of the arc voltage or the particular picture being projected a two-blade shutter. In such event, the blades 7 and 8 are oppositely circumferentially swung or moved together into the overlapping position thereof shown in Figure 1, their movement to such position being limited and regulated by the engagement of their fingers 15 with the opposite ends 5′ of the flanges 5. When in such overlapping position, it will be seen that the blades 7 and 8 jointly provide a blade or sector substantially the same in size with, and located approximately diametrically opposite the fixed blade or sector 6, the overlapping blades 7 and 8 being preferably releasably secured in such position by means of a screw or the like 14 extended or projected through registering perforations in the blades 7 and 8 and in the rings 12.

Should the arc voltage of the machine require a three-blade shutter, or should a three-blade shutter be desired in the projection of any particular picture or film, the screw 14 is removed and the blades 7 and 8 oppositely circumferentially swung or spread apart into the spaced position thereof illustrated in Figure 2, their movement to such spread apart or spaced position being limited and controlled by the engagement of their body-portions *a* with the ends 5″ of the flanges 5. When in such latter or three-blade position, it will be seen by reference to Figure 2 that the several blades are radially approximately equidistantly spaced, the blades 7 and 8 being each preferably releasably secured in such spaced position by means of a screw or the like 16 projected through the rings 12 and the respective blades.

By the construction described I am enabled, readily and conveniently, and without interchange of parts, to vary the light obstructions presented by the shutter per revolution to quickly meet the requirements of machine arc voltage or the particular picture being projected. The several blades 6, 7 and 8 may be of any suitable material; I prefer, however, to construct the several blades of sheet metal having perforations of relatively very small size or mesh, such as substantially the perforations 17 here shown. This perforated sheet metal may be readily procured and at the same time is durable and may be conveniently cleaned. Blades or sectors so constructed sufficiently shut off from the screen film movements during change of film scenes, but yet do not completely exclude from the screen projected rays of light from the machine during change of film scenes.

By means of a shutter employing perforated adjustable blades such as here shown, I not only also effect an economy in the use of electric current, but the rays of light from the projecting machine are diffused upon the screen, changes from light to dark and from dark to light are uniform and regular, and flickering, streaks, and sharp contrasts from light to dark and from dark to light are eliminated.

I do not wish to be understood as limiting myself to such material as perforated sheet metal for the several blades, as I consider any material which will diffuse the rays of light to be the equivalent of the material mentioned; and it is to be further understood that changes in the form, construction, arrangement, and combination of the several parts of my new shutter may be made and substituted for those herein shown and described without departing from the nature and principle of my invention.

Having thus described my invention, what I claim and desire to secure by Letters Patent is:

1. A motion-picture projecting-machine shutter comprising, in combination, a hub, a blade fixed relatively to the hub, a plurality of blades shiftable circumferentially relatively to the hub and the fixed blade for varying the number of light-obstructions presented by the shutter per revolution, and means for limiting the circumferential movement of the shiftable blades relatively to the fixed blade, the shiftable blades being circumferentially spaced from the fixed blade throughout their limit of movement.

2. A motion-picture projecting-machine shutter comprising, in combination, a blade fixed relatively to the hub, a pair of blades shiftable circumferentially relatively to the hub and the fixed blade for varying the number of light-obstructions presented by the shutter per revolution, and means for limiting the circumferential movement of the shiftable blades relatively to the fixed blade, the shiftable blades being circumferentially spaced from the fixed blade throughout their limit of movement.

3. A motion-picture projecting-machine shutter comprising, in combination, a hub, a blade fixed relatively to the hub, a pair of blades shiftable circumferentially relatively to the hub, the fixed blade, and each other for varying the number of light-obstructions presented by the shutter per revolution, and means for limiting the circumferential movement of the shiftable blades relatively to the fixed blade and to each other, the shiftable blades being circumferentially spaced from the fixed blade throughout their limit of movement.

4. A motion-picture projecting-machine shutter comprising, in combination, a hub, a blade fixed relatively to the hub, a pair of blades shiftable circumferentially relatively to the hub, the fixed blade, and each other for varying the number of light-obstructions presented by the shutter per revolution, and means for limiting the circumferential movement of the shiftable blades relatively to the fixed blade and to each other, the shiftable blades being circumferentially spaced from the fixed blade throughout their limit of movement, said means including a flanged-plate adapted for engagement with the bodies of the shiftable blades, and fingers on the shiftable blades adapted for engagement with the plate.

5. A motion-picture projecting-machine shutter comprising, in combination, a hub, a disk fixed on the hub, the disk being provided with spaced marginal flanges, a blade having a portion disposed upon the hub and between opposing ends of the flanges and thereby held in fixed position relatively to the hub, a pair of blades having portions loosely disposed upon the hub and shiftable circumferentially relatively to the hub, the fixed blade, and each other between the opposite opposing ends of the flanges for varying the number of light-obstructions presented by the shutter per revolution, and fingers on the shiftable blades adapted for engagement with the flanges of the disk for limiting the movement of the shiftable blades towards each other.

6. A motion-picture projecting-machine shutter comprising, in combination, a hub, a pair of concentric rings disposed around and spaced from the hub, a blade having a portion disposed upon the hub and a portion disposed between and fixed to the rings, a plurality of additional blades having portions loosely disposed upon the hub and portions disposed for movement between the rings, said additional rings being adjustably shiftable circumferentially relatively to the hub, the fixed blade, and each other for varying the number of light-obstructions presented by the shutter per revolution, and means for limiting the shiftable adjustment of the shiftable blades relatively to the hub, the fixed blade, and each other, the shiftable blades being circumferentially spaced from the fixed blade throughout their limit of movement.

7. A motion-picture projecting-machine shutter comprising, in combination, a hub, a pair of concentric rings disposed around and spaced from the hub, a blade having a portion disposed upon the hub and a portion disposed between and fixed to the rings, a plurality of additional blades having portions loosely disposed upon the hub and portions disposed for movement between the rings, said additional blades being adjustably shiftable circumferentially relatively to the hub, the fixed blade, and each other for varying the number of light-obstructions presented by the shutter per revolution, means for limiting the shiftable adjustment of the shiftable blades relatively to the hub, the fixed blade, and each other, the shiftable blades being circumferentially spaced from the fixed blade throughout their limit of movement, and means adapted for engagement with the shiftable blades and with the rings for securing the shiftable blades in adjustably shifted positions.

8. A motion-picture projecting-machine shutter comprising, in combination, a hub, a pair of concentric rings disposed around and spaced from the hub, a sector-shaped blade of perforated sheet material having a portion disposed upon the hub and a portion disposed between and fixed to the rings, a plurality of additional sector-shaped blades of perforated sheet material having portions loosely disposed upon the hub and portions disposed for movement between the rings, said additional blades being adjustably shiftable circumferentially relatively to the hub, the fixed blade, and each other for varying the number of light-obstructions presented by the shutter per revolution, means for limiting the shiftable adjustment of the shiftable blades relatively to the hub, the fixed blade, and each other, the shiftable blades being circumferentially spaced from the fixed blade throughout their limit of movement, and pins adapted for engagement with the shiftable blades and with the rings for securing the shiftable blades in adjustably shifted positions.

9. A rotary shutter for motion-picture projecting-machines, the same comprising, in combination, a hub, a plurality of blades shiftable circumferentially relatively to the hub and to each other for varying the number of light-obstructions presented by the shutter per revolution, and means for releasably locking the blades in shifted positions, said blades after adjustment being stationary relatively to each other throughout the rotary movements of the shutter.

10. A rotary shutter for motion-picture projecting-machines, the same comprising, in combination, a hub, a pair of blades shiftable circumferentially relatively to the hub and to each other into overlapping or spaced position for varying the number of light-obstructions presented by the shutter per revolution, and means for releasably locking said blades in either such overlapping or spaced positions, said blades after adjustment being stationary relatively to each other throughout the rotary movements of the shutter.

11. A rotary shutter for motion-picture projecting-machines, the same comprising, in combination, a hub, a pair of blades shiftable circumferentially relatively to the hub and to each other into overlapping or spaced positions for varying the number of light-obstructions presented by the shutter per revolution, and means including a ring spaced from and having connection with the hub and pins adapted for removable engagement with the respective blades and with the ring for releasably locking the blades in either such over-lapping or spaced positions, said blades after adjustment being stationary relatively to each other throughout the rotary movements of the shutter.

12. A rotary shutter for motion-picture projecting-machines, the same comprising, in combination, a hub, a pair of blades shiftable circumferentially relatively to the hub and to each other into overlapping or spaced positions for varying the number of light-obstructions presented by the shutter per revolution, means including a ring spaced from and having connection with the hub and pins adapted for removable engagement with the respective blades and with the ring for releasably locking the blades in either such over-lapping or spaced positions, and means for limiting the shiftable adjustments of said blades relatively to each other and to the hub, said blades after adjustment being stationary relatively to each other throughout the rotary movements of the shutter.

13. A motion-picture projecting-machine shutter comprising, in combination, a hub, a pair of blades shiftable circumferentially relatively to the hub and to each other into overlapping and spaced positions for varying the number of light-obstructions presented by the shutter per revolution, and means for limiting the circumferential movement of the blades relatively to the hub and to each other, said means including a flanged-plate adapted for engagement with the bodies of the shiftable blades, and fingers on the shiftable blades adapted for engagement with the plate.

14. A motion-picture projecting-machine shutter comprising, in combination, a hub, a pair of concentric rings disposed around and spaced from the hub, a pair of blades having portions loosely disposed upon the hub and portions disposed for movement between the rings, said blades being adjustably shiftable circumferentially relatively to the hub and to each other into overlapping and spaced positions for varying the number of light-obstructions presented by the shutter per revolution, and means for fastening the blades in adjustably shifted positions.

15. A motion-picture projecting-machine shutter comprising, in combination, a hub, a pair of concentric rings disposed around and spaced from the hub, a pair of blades having portions loosely disposed upon the hub and portions disposed for movement between the rings, said blades being adjustably shiftable circumferentially relatively to the hub and to each other into overlapping and spaced positions for varying the number of light-obstructions presented by the shutter per revolution, and pins adapted for engagement with the blades and with the rings for securing the blades in adjustably shifted positions.

16. A shutter of the character described comprising a hub, blades shiftable circumferentially of the hub, means for independently fastening the blades in adjusted position, and means for connecting a pair of said blades to one another.

In testimony whereof, I have signed my name to this specification.

JOHN B. BLANTON.